Nov. 10, 1964 A. J. KLINE, JR 3,156,901

SHIFT REGISTER SYSTEMS

Original Filed Feb. 27, 1957 4 Sheets-Sheet 1

INVENTOR.
ARTHUR J. KLINE, JR.

BY Morris b. Rabkin

ATTORNEY

INVENTOR.
ARTHUR J. KLINE, JR
BY Morris Rabkin
ATTORNEY

INVENTOR.
ARTHUR J. KLINE, JR.
BY Morris Rabkin
ATTORNEY

INVENTOR.
ARTHUR J. KLINE, JR.
BY Morris A. Rabkin
ATTORNEY

United States Patent Office 3,156,901
Patented Nov. 10, 1964

3,156,901
SHIFT REGISTER SYSTEMS

Arthur J. Kline, Jr., Phoenix, Ariz., assignor to Radio Corporation of America, a corporation of Delaware Continuation of application Ser. No. 642,888, Feb. 27, 1957. This application Dec. 29, 1960, Ser. No. 79,460
7 Claims. (Cl. 340—173)

This is a continuation of co-pending application, Serial No. 642,888, filed February 27, 1957, and assigned to the same assignee.

This invention relates to electronic shift registers, and particularly to shift register systems for providing certain counting ratios.

In certain shift register systems, a shift register is connected to have its final stage recirculate signals to its first stage. Thereby, for example, a ring counter may be formed to provide a counting ratio corresponding to the number of shift register stages.

It is among the objects of this invention to provide:

A new and improved shift register system;

A new and improved shift register system for affording certain counting ratios;

A new and improved shift register system for producing certain pulse patterns.

In accordance with this invention, a shift register system is arranged to recirculate pulses to the first stage from a plurality of other stages. The shift register may be filled and then emptied in accordance with input pulses that are received. This system may be used, for example, to provide a counting ratio that is greater than the number of register stages.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
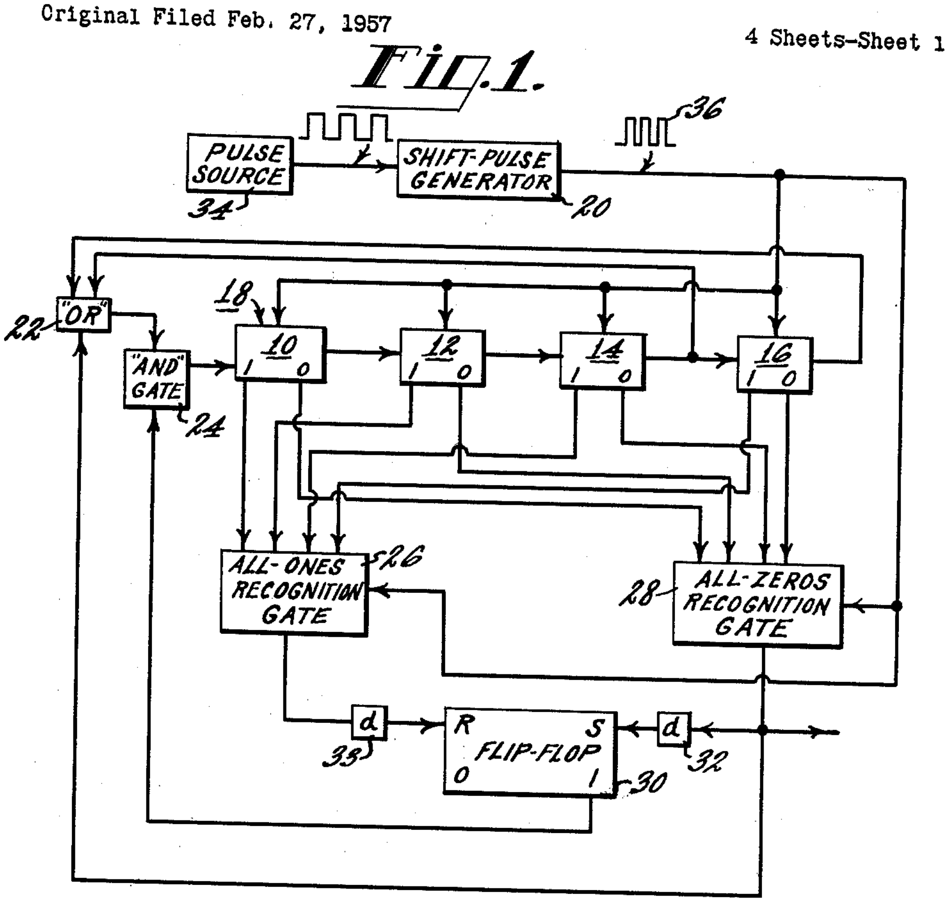
FIGURE 1 is a block diagram of a shift register system embodying this invention.

In the system of FIGURE 1, four stages 10, 12, 14, and 16 of a binary shift register are connected in series, the first stage 10 being connected to the second stage 12, the second stage 12 being connected to the third stage 14, and so on. The shift register 18 may be of various types, such as magnetic-core shift registers or vacuum-tube shift registers. Suitable shift registers of the vacuum-tube type, in which each stage is an Eccles-Jordan flip-flop circuit, or bistable element, are described in the book "Automatic Digital Calculators" by Booth and Booth, 1953, starting at page 103. In such a vacuum tube shift register, the binary state of each flip-flop stage is transferred to the succeeding stage upon the application of a shift pulse from a shift pulse generator 20. Thus, if the first stage 10 is in the 1-state (or 0-state), that 1-state (or 0-state) is transferred to the second stage 12 upon the application of a shift pulse from the generator 20. The shift pulse itself tends to drive the stages to the 0-state. The same shift pulse is applied unconditionally (i.e., without gating) to all of the stages simultaneously, and the states of each stage are transferred to the succeeding stage with the application of a shift pulse.

The output of the third stage 14 is connected to an input of an "or" gate 22. Similarly, the output of the last stage 16 is also connected to an input of the "or" gate 22. The output of the "or" gate 22 is connected to an input of a two-input "and" gate 24. The output of the gate 24 is connected to the input of the first stage 10 of the shift register 18.

Each of the stages 10, 12, 14 and 16 is also provided with two additional outputs, a 1-output and a 0-output. These 1- and 0-outputs of each stage provide an enabling voltage level when the associated state is in the corresponding binary state, "1" or "0," and an inhibiting voltage level when the associated flip-flop is in the reverse binary state. The 1-outputs of the stages 10, 12, 14 and 16 are connected to inputs of a recognition gate, which gate 26 operates to recognize the condition of all the stages being in the 1-state. The 0-outputs of the stages 10, 12, 14 and 16 are applied to recognition gate 28, which gate 28 recognizes the condition of all the stages being in the 0-state. The shift pulse generator 20 also supplies pulses to the gates 26 and 28. The gates 26 and 28 are coincidence gates that pass a shift pulse only when they are enabled by all of their inputs.

The outputs of these gates 26 and 28 are respectively applied to the reset and set inputs of the flip-flop 30 via delay lines 33 and 32. The output of the gate 28 is also applied to another input of the "or" gate 22. The 1-output of the flip-flop 30 is applied to another input of the "and" gate 24. This flip-flop output supplies an enabling and an inhibiting voltage, respectively, when the flip-flop 30 is set and reset. A pulse source 34 supplies a train of pulses to the generator 20. The generator 20 supplies a shift pulse 36 in response to each pulse received from the source 34. The delay period of each delay line 32 and 33 is of the order of the duration of a shift pulse 36.

The operation of the shift register system of FIGURE 1 is described with reference to the timing graph of FIGURE 2. Initially, the shift register stages 10, 12, 14 and 16 are all in the 0-state, and the flip-flop 30 is reset. With this shift register condition, the recognition gate 28 is in a fully enabled condition due to enabling voltages from the 0-outputs of all the shift register stages. Accordingly, the first shift pulse 36 is passed by gate 28. However, this passed pulse is blocked by the "and" gate 24 which receives at that time an inhibiting voltage from the 1-output of the reset flip-flop 30. This flip-flop 30 is set by the same shift pulse 36 passed by the gate 28 after the delay of the delay circuit 32. Thus, after the first shift pulse 36, the shift register stages 10, 12, 14 and 16 are still in the 0-state, and the flip-flop 30 is set.

The second shift pulse 36 is again passed by the all-zeros recognition gate 28 and applied, via the "or" gate 22, to the "and" gate 24. This pulse is passed by the gate 24 and drives the first stage 10 to the 1-state. After the first stage 10 is driven to the 1-stage, the recognition gate 28 is closed.

The third shift pulse 36 advances the 1-state from the first stage 10 to the second stage 12, and the fourth shift pulse advances the 1-state from the second stage 12 to the third stage 14. The fifth shift pulse advances the 1-state from the third stage 14 to the fourth stage 16, and, also, recirculates this 1-state back to the first stage 10 via the "or" gate 22 and the enabled "and" gate 24.

Figure 2:
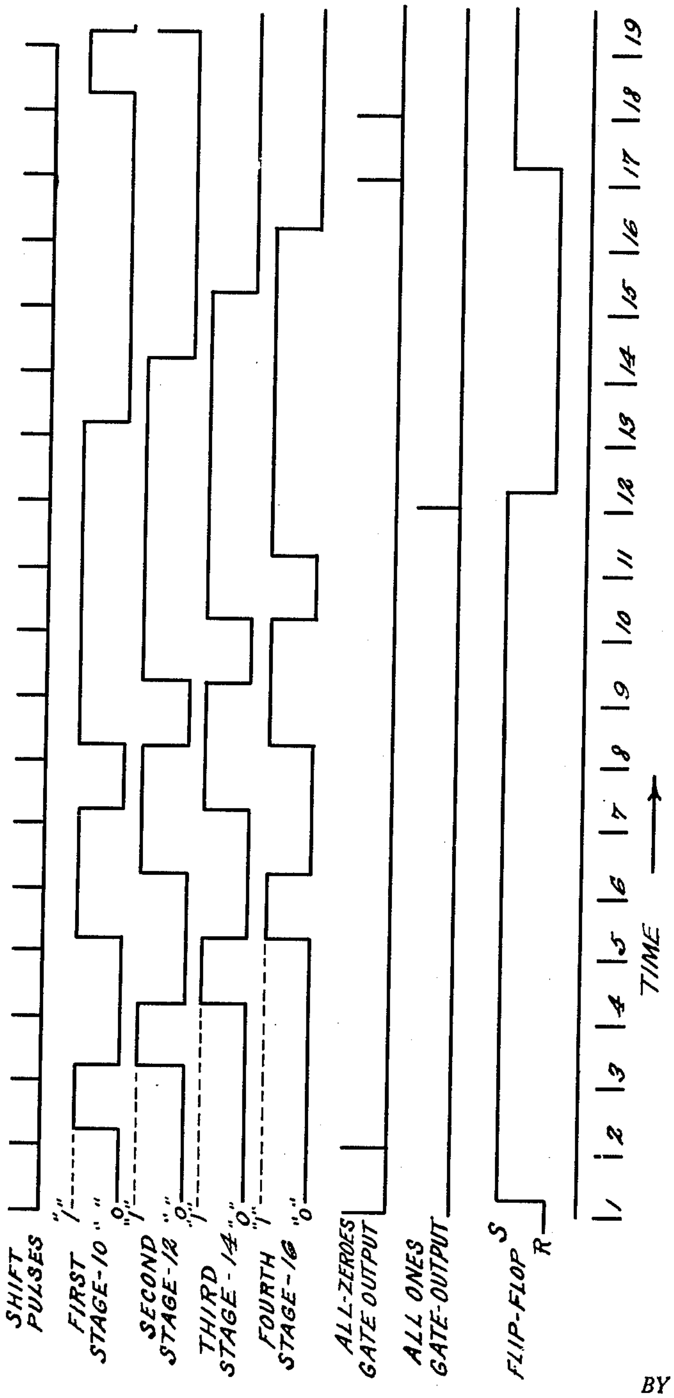
FIGURE 2 is an idealized graph of the time relationships of certain operations occurring at certain portions of the system of FIGURE 1.

As shown in FIGURE 2, successive shift pulses after the fifth advance the 1-states to succeeding shift register stages and recirculate this 1-state to the first stage 10 from the third stage 14 and the fourth stage 16. The eleventh shift pulse completes the filling of the shift register 18 by advancing the 1-state from the third stage 14 to the fourth stage 16 and by recirculating this 1-state back to the first stage 10, so that all four stages are in the 1-state. Under these conditions, the all-ones recognition gate 26 is in the fully enabled condition, and passes the next shift pulse 36 via the delay circuit 33 to reset the flip-flop 30. Since the flip-flop 30 is in the set condition when this same shift pulse, the twelfth, is applied to the register stages, the 1-state is recirculated in the register 18, and all the shift register stages are again in the 1-state.

When the thirteenth shift pulse is applied, the flip-flop 30 is reset, which reset condition closes the gate 24 to recirculation signals from the third and fourth shift register stages 14 and 16. Accordingly, this thirteenth shift pulse serves to advance the 1-state from each of the shift register stages 10, 12 and 14 to the succeeding stages 12, 14 and 16, respectively. However, due to the closed condition of the gate 24, the 1-state of the third and fourth stages 14 and 16 is not recirculated to the first stage 10, and that first stage 10 is changed to the 0-state. This operation is repeated with each succeeding shift pulse 26, the next such pulse 36 serving to advance the 0-state of the first stage 10 to the succeeding stage, and so on. The sixteenth shift pulse changes the fourth stage 16 to the 0-state, and all the shift register stages are then in the 0-state. The all-zeros recognition gate 28 is in the fully enabled condition and open to the next shift pulse 36. The seventeenth shift pulse finds the recognition gate 28 open and sets the flip-flop 30 to start a second full cycle. The operation described above starting with the first shift pulse is then repeated.

As may be seen from the waveform graph of FIGURE 2, a complete cycle of operation is completed in sixteen shift pulses, and a new cycle is started on the seventeenth pulse. The pulse passed by the all-zeros recognition gate 28 to set the flip-flop 30, or the setting of the flip-flop itself, may be used to mark the beginning of each cycle of operation. Such a pulse from the gate 28 (or the flip-flop setting) may be used to mark every sixteen pulses supplied from the source 34. It has been found that the following formula may be used to determine the number of input or shift pulses that produce a complete cycle: $(n-1)(n-p)+n+q$, where $n$ is the number of stages in the recirculating shift register, $n-p$ is the order of stage from which the first recirculation takes place, and $q$ is the number of pulses required to recognize the all-one and all-zero states and to perform the control operations. Thus, for the system of FIGURE 1, $n-1$ is 3, $n-p$ is 3, and $q$ is equal to the sum of 3 pulses and 1 pulse; that is, the sum of the three pulses required to recognize the all-zero state and have a first pulse entered into the shift register and the additional pulse, the twelfth shift pulse, occurring after the shift register has filled, required to recognize this condition. Thus, this formula is consistent with the sixteenth pulse cycle in which the system of FIGURE 1 operates. In this formula, the product term indicates the number of shift pulses that are required to fill the register from the 0-state, the next term $n$ is the number of input pulses required to empty the register, and $q$ the number of shift pulses required to perform the control operations.

Figure 3:
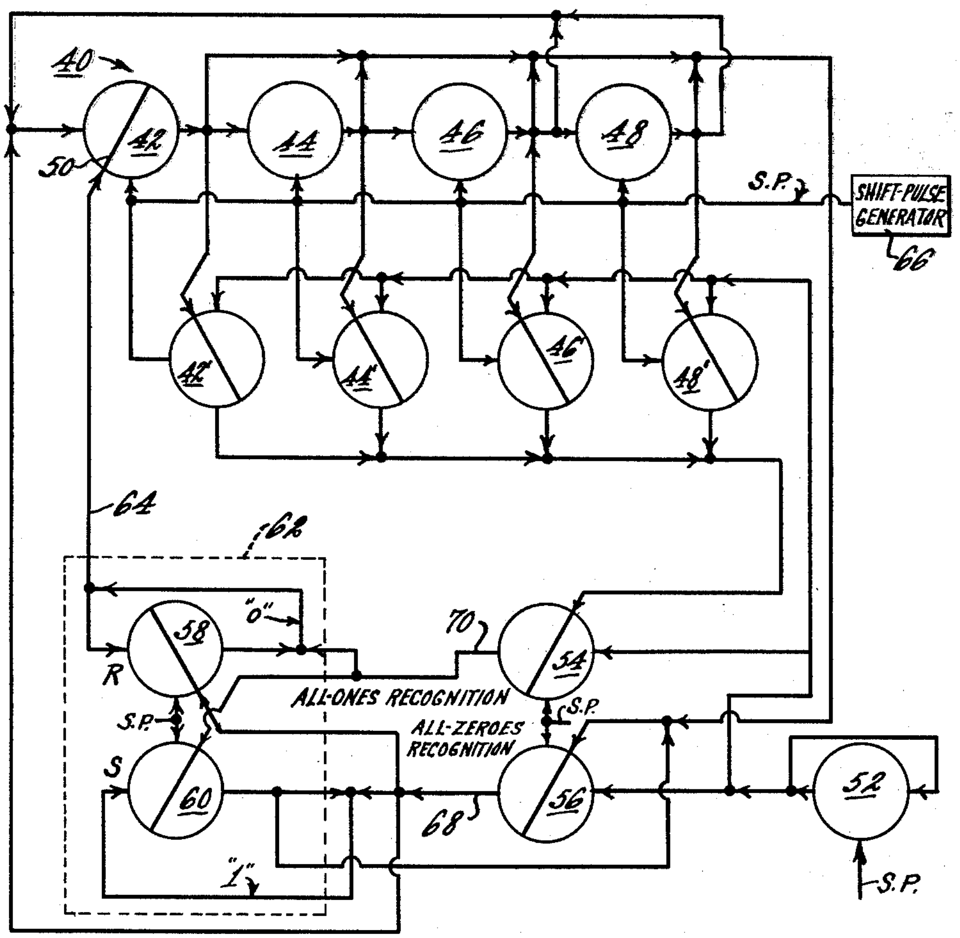
FIGURE 3 is a schematic diagram of a magnetic core shift register system embodying this invention.

In FIGURE 3, a shift register system similar to that of FIGURE 1 is shown in which magnetic cores are used as the shift register bistable elements. In FIGURE 3, a shift register 40 includes the magnetic cores 42, 44, 46 and 48. Windings (not shown) on these cores are coupled from core to core by means of transfer circuits (not shown). The arrangement is such that the cores form a serial shift register from the first core 42 to the last core 48. A magnetic-core shift register of this type is described in the article in the "Proceedings of the I.R.E." of March 1955, entitled "Logical and Control Functions Performed With Magnetic Cores," at page 291. Symbols used in the system of FIGURE 3 are explained in some detail in this article.

In the shift register 40, there is a recirculation connection back from the third stage 46 and from the fourth stage 48 to the first stage 42 in a manner similar to that described above with respect to FIGURE 1. A suitable mixer or "or" gate (not shown) is used to couple these recirculation paths to the input of the core 42; such "or" gates (not shown) are used where required in other portions of the system of FIGURE 3. The first core 42 also includes an inhibitory winding 50, indicated by the slant bar through the core. This inhibitory winding, when energized, opposes the magnetizing effect of an input pulse received by the same core.

Corresponding to each one of the shift register cores 42, 44, 46 and 48 is a complement core 42', 44', 46' and 48', respectively. Inhibitory inputs of the complement cores 42', 44', 46' and 48' receive the outputs of the shift register cores 42, 44, 46, 48, respectively. These complement cores also receive inputs that are pulses from a pulse generator core 52. This pulse generator core 52 has a recirculation transfer path from its output winding to its input winding.

Two cores 54 and 56 are used to recognize the condition of all-ones in the shift register 40 and all-zeros in that register 40, respectively. These cores receive as input pulses from the generator core 52. The core 54 also receives as an inhibitory input the outputs of the complement cores 42', 44', 46', 48' mixed in an "or" gate (not shown). Similarly, the core 56 receives as an inhibitory input the outputs of the register cores 42, 44, 46, 48 suitably mixed.

Two cores 58 and 60 are interconnected to form a flip-flop circuit 62. These flip-flop cores 58 and 60 have individual recirculation paths from their output windings to their input windings. The output of the recognition core 54 is applied to the input of the core 58, and also to the inhibitory input of the core 60. The output of the core 56 is applied to the input of the core 60, to the inhibitory input of the core 58, and to the input of the first register stage 42. Signals applied to the input of the core 58 are also applied to the inhibitory input 50 of the first register core 42 by way of the circuit connection 64. Shift pulses are supplied by a generator 66; each shift pulse (S.P.) is applied simultaneously and unconditionally to all the cores of the system of FIGURE 3.

As initial operating conditions, the cores of the register 40 may all be set to the 0-state, and the complement cores 42', 44', 46', 48' set to the 1-state. The core 52 is set to the 1-state, the cores 54, 56 set to the 0-state, the core 58 set to the 1-state, and the core 60 set to the 0-state. Suitable windings (not shown) may be used on these cores for setting these initial conditions.

Figure 4:
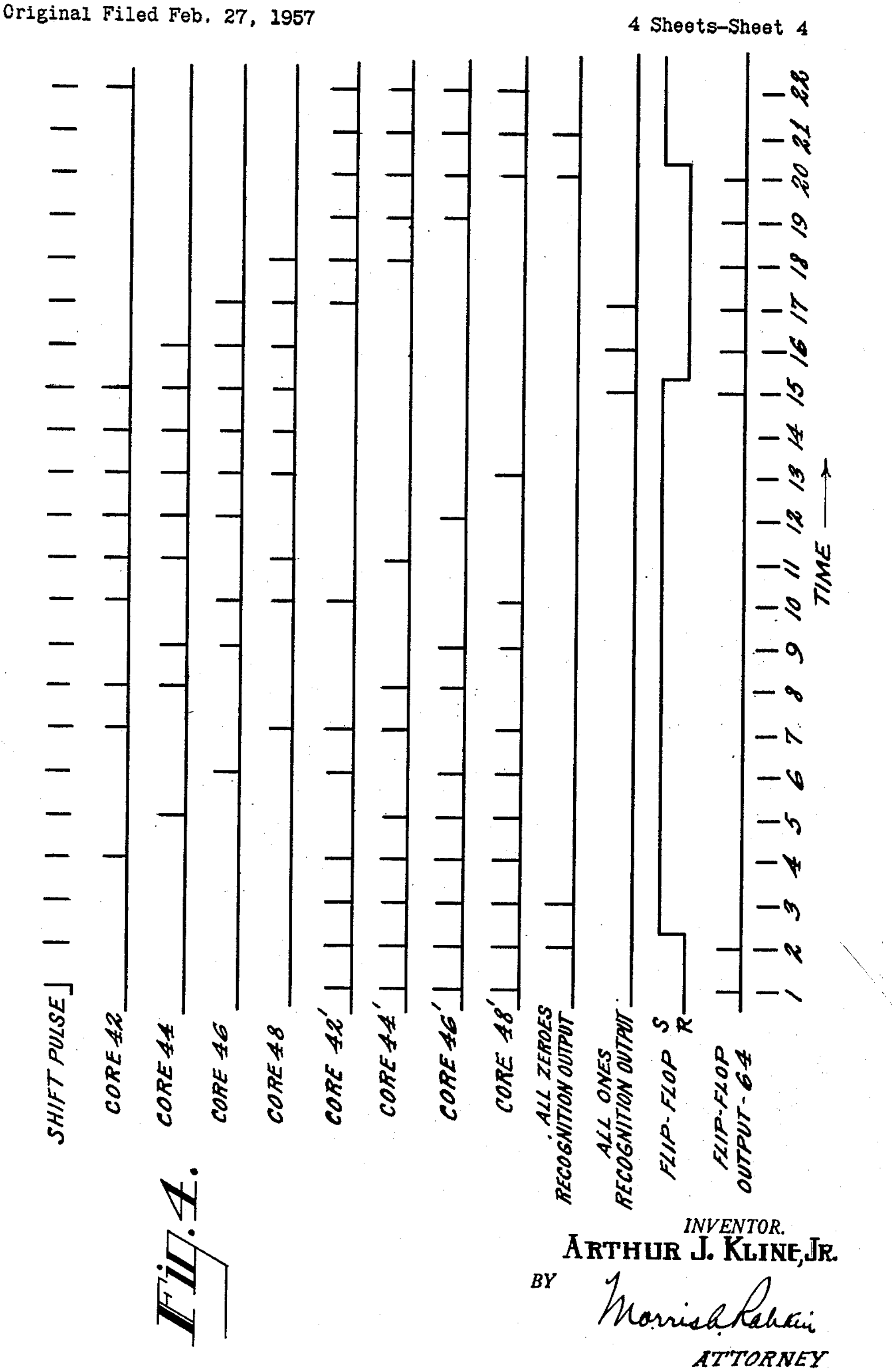
FIGURE 4 is an idealized graph of waveforms occurring at certain portions of the system of FIGURE 2.

The operation of the system of FIGURE 3 is described with reference to the timing graph of FIGURE 4. The first shift pulse finds the flip-flop 62 in the reset condition, that is, with the core 58 in the 1-state and the core 60 in the 0-state. This first shift pulse drives the core 58 to recirculate a pulse, which recirculated pulse restores the core 58 to the 1-state. This recirculated pulse also appears at the flip-flop output connection 64 and is applied as an inhibitory input to the first stage core 42. The time relationship of these operations may be seen in the waveform diagram of FIGURE 4 for the first shift pulse. There are no output pulses from the register cores 42, 44, 46, 48, and there is an output pulse from each of the complement cores to the 1-state.

This same first shift pulse does not produce an output pulse from the recognition cores 54 and 56, because these cores were initially in the 0-state. The output pulses from the complement cores inhibit a pulse from the generator core 52 applied to the recognition core 54, which operation results in the core 54 remaining in the 0-state. However, the absence of pulses from the register cores 42, 44, 46, 48 means there are no inhibitory pulses applied to the recognition core 56. Consequently, the pulse from the generator core 52 drives the recognition core 56 to the 1-state. This action of the core 56 going to the 1-state is a recognition of the all-zero condition of the shift register cores 42, 44, 46, 48. Thus, the first shift pulse results in the recognition of the all-zero condition of the shift register 40; otherwise, the circuit remains unchanged.

The second shift pulse produces generally the same operation in the system as that produced by the first shift pulse, except that the all-zeros recognition core 56 is driven from the 1-state to the 0-state to produce an output pulse at the connection 68. This pulse from the core 56 is applied to the first register core 42 as an input; however, it is inhibited by the simultaneous application of an inhibitory pulse from the flip-flop output 64. This same pulse at the output 68 is applied to the input of the core 60 to drive that core to the 1-state, which action sets the flip-flop 62. This same pulse at the output 68 is also applied to the inhibitory input of the core 58 to inhibit the action on that core 58 of the recirculated pulse applied to its input. With no output pulse from the register cores 42, 44, 46, 48, the recognition core 56 is again driven to the 1-state by a pulse from the generator core 52. Thus, the effect of the second shift pulse is to set the flip-flop 62; otherwise, the circuit remains unchanged in its conditions.

The third shift pulse again produces a pulse at the output 68 of the recognition core 56. This pulse is applied to the input of the first register core 42. This pulse is applied to the input of the first register core 42, and, being uninhibited due to the absence of a pulse at the flip-flop output 64, this pulse drives the first register core 42 to the 1-state. This same pulse at the output 68 does not change the state of the flip-flop 62. A pulse produced at the output of the flip-flop core 60 is applied to the inhibitory input of the recognition core 56 to inhibit the action of the pulse from the generator core 52; thereby, the core 56 remains in the 0-state.

The fourth shift pulse changes the state of the first register core 42 to produce an output pulse. This pulse from the core 42 is transferred to the core 44 to drive that core to the 1-state. This same pulse from the core 42 is also applied as an inhibitory pulse to its complement core 42′ to prevent that core 42′ from being driven to the 1-state. This same pulse from the core 42 is applied as an inhibitory pulse to the recognition core 56, so that core 56 continues in the 0-state. This fourth shift pulse finds the recognition core 56 in the 0-state, and no pulse is produced at the output 68.

The fifth shift pulse drives the second register core 44 to the 0-state to produce an output pulse, which is transferred to the third core 46 to drive that core 46 to the 1-state. This same pulse from the core 44 is applied as an inhibitory pulse to the cores 44′ and 56.

The sixth shift pulse drives the third core 46 to the 0-state to produce a pulse that is transferred to the fourth stage core 48 to drive that core 48 to the 1-state. This same pulse from the core 46 is also recirculated back to the first core 42 to drive that core to the 1-state. The seventh shift pulse produces output pulses from the fourth core 48 and from the first core 42. These pulses are respectively transferred to the first and second cores 42 and 44.

This operation continues for successive shift pulses, the 1-states of the cores being transferred to the succeeding stage cores of the register and also being recirculated back to the first core from the third and fourth cores 46 and 48. The twelfth shift pulse (FIGURE 4) causes a transfer of a pulse from the first three register cores 42, 44, 46 to the last three register cores 44, 46, 48, respectively, and the recirculation of the pulse from the third core 46 back to the first core 42. Thus, this twelfth shift pulse results in the register 40 being filled. This same twelfth shift pulse finds the complement core 46′ in the 1-state and produces an output pulse from that core 46′, which pulse inhibits the all-ones recognition core 54. Due to the absence of an output pulse from the fourth register core 48, the fourth complementary core 48′ is driven to the 1-state by a pulse from the generator core 52.

The thirteenth shift pulse finds all of the register cores 42, 44, 46, 48 in the 1-state, and produces output pulses from each one of these cores. However, this same thirteenth pulse finds the complementary core 48′ in the 1-state, which results in an output pulse that inhibits the recognition core 54. Thus, the recognition core 54 is still in the 0-state when the fourteenth shift pulse is applied.

At the fourteenth shift pulse, all of the register cores 42, 44, 46, 48 are in the 1-state, and this pulse does not change that condition. This same fourteenth shift pulse finds all of the complement cores 42′ 44′, 46′, 48′ in the 1-state, which results in a continuance of that condition also. No output pulse is produced from these complement cores and, as a result, there is no inhibitory pulse applied to the recognition core 54. Accordingly, this core 54 is driven to the 1-state by a pulse from the generator core 52, which action is a recognition of the all-ones condition.

The fifteenth shift pulse produces the same effects on the register cores and the complement cores as the preceding shift pulse. This same fifteenth pulse drives the recognition core 54 to the 0-state from the 1-state to produce an output pulse at the connection 70. This pulse at the connection 70 is applied to the input of the core 58 to drive that core 58 to the 1-state; thereby, the flip-flop 62 is reset. This same pulse at the output 70 is also applied to the connection 64 to inhibit the first stage core 42 to the register 40. This inhibitory pulse blocks recirculation to the first stage 42, and that first stage is left in the 0-state at the end of the fifteenth shift pulse. The same pulse at the output 70 is applied to the inhibitory input of the core 60 to inhibit the action of the recirculated pulse of that core 60.

The sixteenth shift pulse produces the transfer of the 0-state from the first core 42 to the second core 44. At the same time, the first core 42 remains in the 0-state because any recirculation to that first core 42 is inhibited by a pulse at the flip-flop output 64.

The succeeding shift pulses produce similar results in the shift register 40, and the eighteenth shift pulse serves to shift the last 1-state from the fourth core 48. Pulses from the flip-flop output 64 continue to inhibit input pulses applied to the first core 42. The last pulse read out from the core 48 by the eighteenth shift pulse inhibits the complement core 48′; otherwise, the condition of the system of FIGURE 3 at the end of the eighteenth pulse is the same as the initial conditions described above that exist before the application of the first shift pulse. Thus, but for the absence of an output pulse from the fourth complementing core 48′, the operation produced by the nineteenth shift pulse is the same as that produced by the first shift pulse. The twentieth shift pulse produces the same operation as the second shift pulse, the twenty-first the same as the third, the twenty-second the same as the fourth.

Thus, the shift register system of FIGURE 3 operates on an eighteen pulse cycle. The start of the cycle may be considered the generation of an all-zero recognition pulse at the output 68 (or the setting of the flip-flop); each eighteen-pulse cycle being marked by two such pulses at the output 68 (or by the flip-flop setting). This eighteen-pulse cycle is consistent with the formula noted above, in which the term $n-1$ is 3, the term $n-p$ is 3, and $n$ is 4, and $q$ is the sum of 2 and 3 corresponding respectively to pulses required for the recognition of all-ones and all-zeros.

Figure 5:
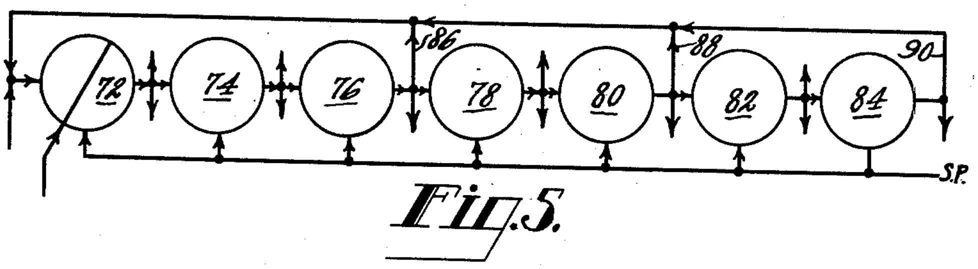
FIGURE 5 is a schematic diagram of another magnetic core shift register system embodying this invention.

In FIGURE 5, another embodiment of this invention is shown in which there are three recirculation paths in the shift register. The shift register of FIGURE 5 includes seven cores 72, 74, 76, 78, 80, 82 and 84; the register connections are the same type as those of the register of FIGURE 3. There is a recirculation connection 86 from the third stage 76 back to the first stage 72, a recirculation connection 88 from the fifth stage 80 back to the first stage 72, and a recirculation connection 90 from the last stage 84 back to the first stage 72. The control circuitry described above with respect to FIGURE 3 may be used in the system of FIGURE 5 in a similar manner.

The operation of the system of FIGURE 5 is similar to that described above and will be readily apparent from the above descriptions. Starting with the entry of the first pulse to the first core 72, twelve pulses are required to fill the seven-core register. Once filled, seven pulses are required to empty the register; five pulses are needde to perform the recognition and control operations in a manner similar to that described above with respect to FIGURE 3. Accordingly, the system of FIGURE 5 has a twenty-four pulse cycle.

It is seen from the above description that the principles of this invention are applicable to various types of shift registers; this invention may be readily used with other types of magnetic core shift registers, and with shift registers using other types of binary elements. This invention is applicable to shift registers having different numbers of stages and different numbers of recirculation paths. The numbers and types of stages and recirculation paths are determined by considerations such as the counting cycle that is desired.

It has been found that, if the stages from which recirculation takes place, that is, if the stages $n$ and $n-p$, have a common numerical factor other than unity, a complete pulse cycle in which the register is filled and then emptied, does not take place. Instead, after the register is only partly filled, a stable condition is reached in which certain recirculation pulse patterns and register conditions occur before the register can fil up. Such a shift register system is shown in FIGURE 6.

Figure 6:
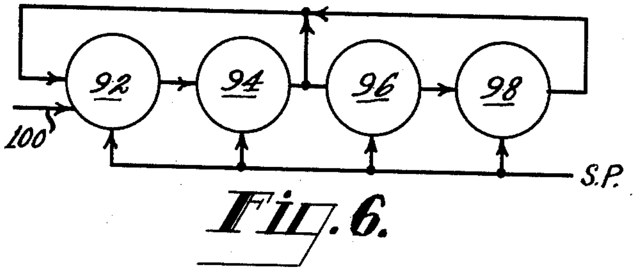
FIGURE 6 is a schematic diagram of another magnetic core shift register system embodying this invention for producing certain pulse patterns.

In FIGURE 6, a shift register system is shown that includes four cores 92, 94, 96, and 98. There is a recirculation path from the second core 94 back to the first core, and a recirculation path back from the fourth core 98 to the first core 92. It is seen that $n$ and $n-p$ have the common numerical factor of 2.

Initially, a 1-state is entered into the first core 92 by any suitable means, such as by a pulse to the input connection 100; that pulse is the only signal supplied by means of this connection 100. The first shift pulse shifts the 1-state to the second core 94. The second shift pulse shifts the 1-state to the third core 96 and recirculates that 1-state back to the first core 92. At the end of this second shift pulse, the pattern of binary conditions of the cores 92, 94, 96, 98 is 1010, respectively. The next shift pulse shifts these 1-states to the succeeding cores so that the pattern of core conditions is 0101, respectively. The next shift pulse restores the core conditions to the previous pattern of 1010, respectively.

Succeeding shift pulses produce these same pulse patterns alternately.

In accordance with this invention, a new and improved shift register system is provided. This system may be used for affording certain counting ratios, and for producing certain pulse patterns.

What is claimed is:

1. A shift register system comprising a shift register having a plurality of stages connected for series operation from a first stage to a last stage, each of said stages including a bistable element for storing binary signals and means for applying simultaneous shift pulses unconditionally to the bistable elements in all of said stages so that each bistable element receives each shift pulse, said elements being responsive to said pulses to shift simultaneously the binary signals stored in said register, and recirculation means connecting the bistable elements in a plurality of said stages to the bistable element in said first stage.

2. A shift register system comprising a shift register having a plurality of stages connected for series operation from a first stage to a last stage, each of said stages including a bistable element for storing binary signals, and means for applying simultaneous shift pulses unconditionally to the bistable elements in all of said stages so that each bistable element receives each shift pulse, said elements being responsive to said pulses to shift simultanously the binary signals stored in said register, recirculation means connecting the bistable elements in a plurality of said stages to the binary element in said first stage, and means responsive to a certain combination of signal-storing conditions of said elements for controlling the recirculation of signals.

3. A shift register system as recited in claim 2 wherein said combination responsive means includes means responsive to one combination of said conditions for preventing the recirculation of signals, and responsive to another combination of said conditions for enabling the recirculation of signals.

4. A shift register system comprising a shift register having a plurality of stages connected in order from a first stage to a last stage, each of said stages including a bistable element for storing binary signals and means for applying simultaneous shift pulses unconditionally to the bistable elements in all of said stages so that each bistable element receives each shift pulse, said elements being responsive to said pulses to shift simultaneously the binary signals stored in said register, and having recirculation means connecting one of said bistable elements to another of preceding order, and means responsive to a certain combination of signal-storing conditions of said elements for controlling the recirculation of signals.

5. A shift register system as recited in claim 4 wherein said combination responsive means includes means responsive to one combination of said conditions for preventing the recirculation of signals, and responsive to another combination of said conditions for enabling the recirculation of signals.

6. A shift register system comprising a shift register having a plurality of stages, each of said stages including a bistable element for storing binary signals, said elements being connected for signal shift operation from each element to a succeeding order element, and means for applying simultaneous shift pulses unconditionally to the bistable elements in all of said stages so that each bistable element receives each shift pulse, said elements being responsive to said pulses to shift simultaneously the signals stored in said register, said register also having a plurality of different recirculation means each for transfer of signals from one of said elements to a preceding order element.

7. A shift register system comprising a shift register having a plurality of stages, each of said stages including a bistable element for storing binary signals, said elements being serially connected for signal shift operation from one element to a succeeding order element, and means for applying simultaneous shift pulses unconditionally to the bistable elements in all of said stages, said elements being responsive to said pulses to shift simultaneously the signals stored in said register, said register also having a plurality of different recirculation means each for transfer of signals from one of said elements to a preceding order element, and means responsive to one combination of signal-storing conditions of said elements for preventing the recirculation of signals and responsive to another combination of said conditions for enabling the recirculation of signals.

References Cited in the file of this patent

UNITED STATES PATENTS

| | | |
|---|---|---|
| 2,652,501 | Wilson | Sept. 15, 1953 |
| 2,806,947 | MacKnight | Sept. 17, 1957 |
| 2,853,238 | Johnson | Sept. 23, 1958 |
| 2,951,230 | Cadden | Aug. 30, 1960 |

UNITED STATES PATENT OFFICE
CERTIFICATE OF CORRECTION

Patent No. 3,156,901 November 10, 1964

Arthur J. Kline, Jr.

It is hereby certified that error appears in the above numbered patent requiring correction and that the said Letters Patent should read as corrected below.

Column 3, line 72, for "sixteenth" read -- sixteen --; column 4, line 41, for "input" read -- inputs --; column 9, line 3, after "stages" insert -- so that each bistable element receives each shift pulse --.

Signed and sealed this 13th day of April 1965.

(SEAL)
Attest:

ERNEST W. SWIDER
Attesting Officer

EDWARD J. BRENNER
Commissioner of Patents